United States Patent
Burgstaller et al.

(10) Patent No.: US 7,291,808 B2
(45) Date of Patent: Nov. 6, 2007

(54) METHOD FOR SETTING PARAMETERS IN WELDING DEVICES

(75) Inventors: Andreas Burgstaller, Eberstalzell (AT); Markus Pernegger, Eberstalzell (AT); Philipp Trinkfass, Taufkirchen a.d.Tratnach (AT)

(73) Assignee: Fronius International GmbH, Pettenbach (AT)

(*) Notice: Subject to any disclaimer, the term of this patent is extended or adjusted under 35 U.S.C. 154(b) by 0 days.

(21) Appl. No.: 10/510,007

(22) PCT Filed: Apr. 1, 2003

(86) PCT No.: PCT/AT03/00094

§ 371 (c)(1),
(2), (4) Date: Sep. 30, 2004

(87) PCT Pub. No.: WO03/084706

PCT Pub. Date: Oct. 16, 2003

(65) Prior Publication Data

US 2005/0205541 A1    Sep. 22, 2005

(30) Foreign Application Priority Data

Apr. 11, 2002 (AT) ................ A 563/2002

(51) Int. Cl.
*B23K 9/10* (2006.01)
(52) U.S. Cl. .................. 219/130.01
(58) Field of Classification Search .......... 219/130.01, 219/130.1, 130.5, 130.4, 130.21, 130.31, 219/130.32, 130.33, 130.51, 132, 137 PS
See application file for complete search history.

(56) References Cited

U.S. PATENT DOCUMENTS

| | | | |
|---|---|---|---|
| 5,278,390 A * | 1/1994 | Blankenship | 219/130.5 |
| 5,343,016 A * | 8/1994 | Davis et al. | 219/130.4 |
| 6,040,555 A | 3/2000 | Tiller et al. | |
| 6,103,994 A * | 8/2000 | DeCoster et al. | 219/132 |
| 6,315,186 B1 * | 11/2001 | Friedl et al. | 228/102 |
| 6,479,793 B1 * | 11/2002 | Wittmann et al. | 219/130.5 |
| 6,570,132 B1 | 5/2003 | Brunner et al. | |
| 6,605,800 B1 * | 8/2003 | Schick et al. | 219/130.5 |
| 6,609,033 B1 * | 8/2003 | Kawai | 700/5 |
| 6,797,921 B1 * | 9/2004 | Niedereder et al. | 219/130.5 |
| 6,930,280 B2 * | 8/2005 | Zauner et al. | 219/132 |

FOREIGN PATENT DOCUMENTS

| | | |
|---|---|---|
| CN | 2085698 U | 3/1991 |
| CN | 1036902 C | 3/1994 |
| EP | 0 903 195 | 3/1999 |
| WO | WO 00 41835 | 7/2000 |

* cited by examiner

*Primary Examiner*—Kevin Kerns
*Assistant Examiner*—Michael Aboagye
(74) *Attorney, Agent, or Firm*—Collard & Roe, P.C.

(57) ABSTRACT

The invention relates to a method for setting a parameter for external control units (30) of a welding device (1), whereby the welding parameters can be selected and set using different control elements (27) and indicating elements (28) on the welding device (1). The aim of the invention is to provide a method of this type with which a flexible adaptation of setting options of external components (29) connected to the welding device (1) is made possible for the most varied applications or welding processes. To this end, a control program (32) is activated in the welding device (1), whereby the selected welding parameter for setting or adjusting is selectively assigned to an external control unit (30) located on an external component (29) so that this welding parameter is set or changed when the external control units (30) on the external components (29) are activated or adjusted.

11 Claims, 2 Drawing Sheets

METHOD FOR SETTING PARAMETERS IN WELDING DEVICES

CROSS REFERENCE TO RELATED APPLICATIONS

Applicants claim priority under 35 U.S.C. §119 of AUSTRIAN Application No. A563/2002 filed on Apr. 11, 2002. Applicants also claim priority under 35 U.S.C. §365 of PCT/AT03/00094 filed on Apr. 1, 2003. The international application under PCT article 21(2) was not published in English.

The invention relates to a method for setting a parameter for external operating units of a welding apparatus, wherein the welding parameters are selectable and settable using different operating elements and display elements provided on the welding apparatus.

Various setting options have already been known in welding apparatus in which the most different parameters can be set from the welding apparatus. In addition, it is feasible to change certain fixedly defined parameters via external components connected thereto. However, this involves the disadvantage that it is frequently necessary to change special parameters for given welding processes or applications in a manner that such changes will only be feasible via the welding apparatus or by exchanging the component for the welding processes or application in question.

EP 0 903 195 A1 describes a system for the remote-controlled setting, controlling and adjustment of functions of welding apparatus, which enable the user to control welding parameters such as, e.g., the welding current strength or welding wire feed without any change of location. To this end, the welding parameters are set or changed via a remote control wirelessly connected with the welding apparatus. In doing so, the user may select among predetermined settings and preset combinations. On account of such preset combinations, the method and welding apparatus are, however, highly inflexible, since it is only feasible to select and change preset welding parameters via the remote control.

U.S. Pat. No. 6,040,555 A discloses a remote control for welding apparatus, in which a remote control detecting special variables such as, e.g, the welding current is inserted between the workpiece and the electrode holder. From the remote control, signals allocated to the detected variables are further transmitted to a control circuit via the welding cable and used to adjust predetermined welding parameters.

U.S. Pat. No. 6,103,994 A describes a welding apparatus to which various external operating units can be connected. The respective external operating unit such as, e.g., a finger switch or a foot switch will automatically be recognized by the welding apparatus. Predetermined welding parameters permitted by the operating unit are allocated as a function of the external operating unit recognized, and the allocated welding parameter will be changed accordingly as a function of the position of the operating unit, for instance the foot switch. In the system according to that document, however, very specific welding parameters are always fixedly allocated to the external operating units to be envisaged.

The invention is based on the object of providing a method for setting a welding parameter for external operating units of a welding apparatus or welding plant, by which a substantial improvement of the operator interface will be achieved and the flexible adaptation to the most different applications or welding processes, of the setting options of the external components connected to the welding apparatus will be feasible.

In accordance with the invention, this object is achieved in that a control program is invoked in the welding apparatus and the selected welding parameter for setting or adjustment is thereby selectively allocated to an external operating unit provided on an external component, such that said welding parameter is set or changed upon activation or adjustment of the external operating unit provided on the external component. A very high flexibility is, thus, ensured in the operation of the welding apparatus, since the user is able to allocate the most different welding parameters to the external components, and vary or set the same from the external component, according to demand. Hence, the most relevant parameters for the most different welding processes can always be allocated to an external component. External components may, in particular, comprise a welding torch, a remote controller, a control panel, a robot control, etc. Basically, it is known from the prior art that parameters fixedly defined by external components may be varied or set in a manner that several different components are used for the most different welding processes or applications in order to obtain the optimum setting option. This is no longer required with the solution according to the invention, since the user is now able to freely allocate to the external component one or several of the desired welding parameters. It is, thus, feasible to use always the same external component for the most different applications or welding processes. From said external component, any other welding parameter can be set and changed according to demand.

In an advantageous manner, the control program is invoked via an operating element provided on the welding apparatus and the welding parameter is allocated to the external operating unit provided on the external component by the renewed activation of an operating element provided on the welding apparatus.

It is, of course, also feasible to allocate several welding parameters to several external operating units provided on one or several external components. To this end, the control program is invoked several times in a row and the desired welding parameter is each allocated to the respectively desired external operating unit provided on the respectively desired external component.

The allocations of the welding parameters to the external operating units of the external components provided in the welding apparatus are preferably stored by a control and/or evaluation device provided in the welding apparatus. As a result, the allocations of the welding parameters are available to the user and may be changed by the user at any time.

In order to realize the flexible parameter allocation, an evaluation of the signals received from the external operating units of the external components is advantageously effected by the control and/or evaluation device of the welding apparatus, and these signals are allocated to the respective welding parameters and changed accordingly. The value of the respective welding parameter can also be displayed on the external component.

Any changes of the external operating units of the external component are transmitted to the welding apparatus, preferably via control lines, optical fibers, bus systems or by radio.

In the following, the invention will be explained in more detail by way of an exemplary embodiment.

FIG. 1 depicts a welding apparatus 1 or welding plant to be used for various welding methods such as, e.g., MIG (metal—inert gas) welding, MAG (metal—active gas) welding, TIG (tungsten—inert gas) welding or electrode welding. It is, of course, feasible to use the solution according to the invention with a power source or welding current source.

Figure 1:
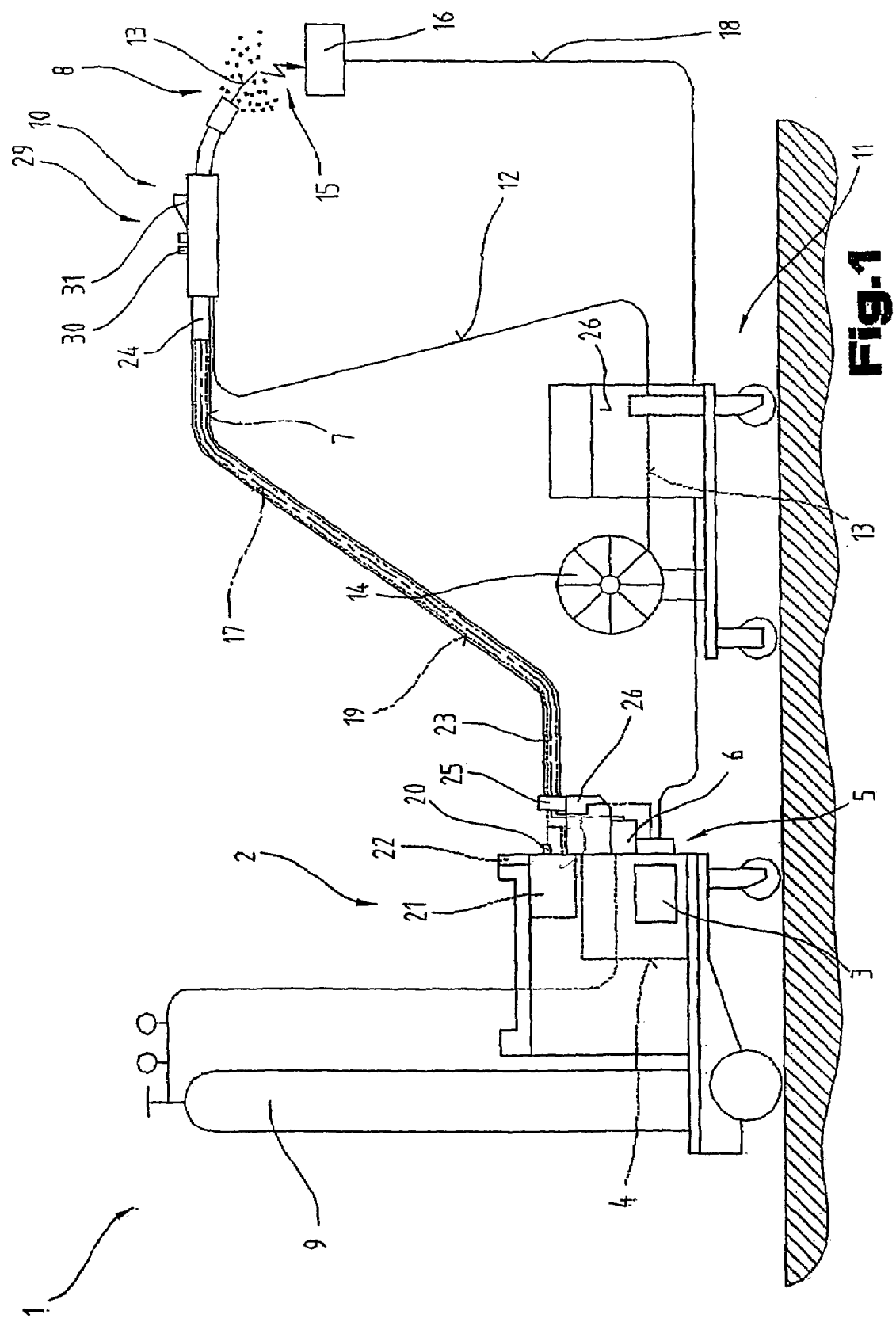
FIG. 1 is a schematic illustration of a welding apparatus.

The welding apparatus 1 comprises a welding current source 2 including an output part 3, a control and/or evaluation device 4 and a switching member 5 associated with the output part 3 and the control and/or evaluation device 4, respectively. The switching member 5 and the control and/or evaluation device 4 are connected with a control valve 6 arranged in a supply line 7 for a gas 8, particularly a protection gas such as, for instance, $CO_2$, helium or argon or the like, between a gas reservoir 9 and a welding torch 10.

In addition, a combined feed and withdrawal device 11 can be activated by the control and/or evaluation device 4, whereby a welding wire 13 is fed via a feed line 12 from a feed drum 14 into the region of the welding torch 10, as usually happens with MIG/MAG welding. It is, of course, possible to arrange the feed drum 14 in the welding apparatus 1, particularly in its basic housing, as is known from the prior art.

The current for building up an electric arc 15 between the welding wire 13 and a workpiece 16 is supplied via a supply line 17 leading from the output part 3 of the power source 2 to the welding torch 10 and the welding wire 13, respectively, wherein the workpiece 16 to be welded is likewise connected with the welding apparatus 1 and, in particular, the current source 2 via a further supply line 18 so as to cause an electric circuit to build up above the electric arc 15.

In order to provide cooling of the welding torch 10, the welding torch 10, via a cooling circuit 19, can be connected with a fluid reservoir and, in particular, water reservoir 21 with a flow control 20 interposed, whereby the cooling circuit 19 and, in particular, a fluid pump used for the fluid contained in the water reservoir 21 is started as the welding torch 10 is put into operation, thus effecting cooling of the welding torch 10 and welding wire 13, respectively.

Figure 2:
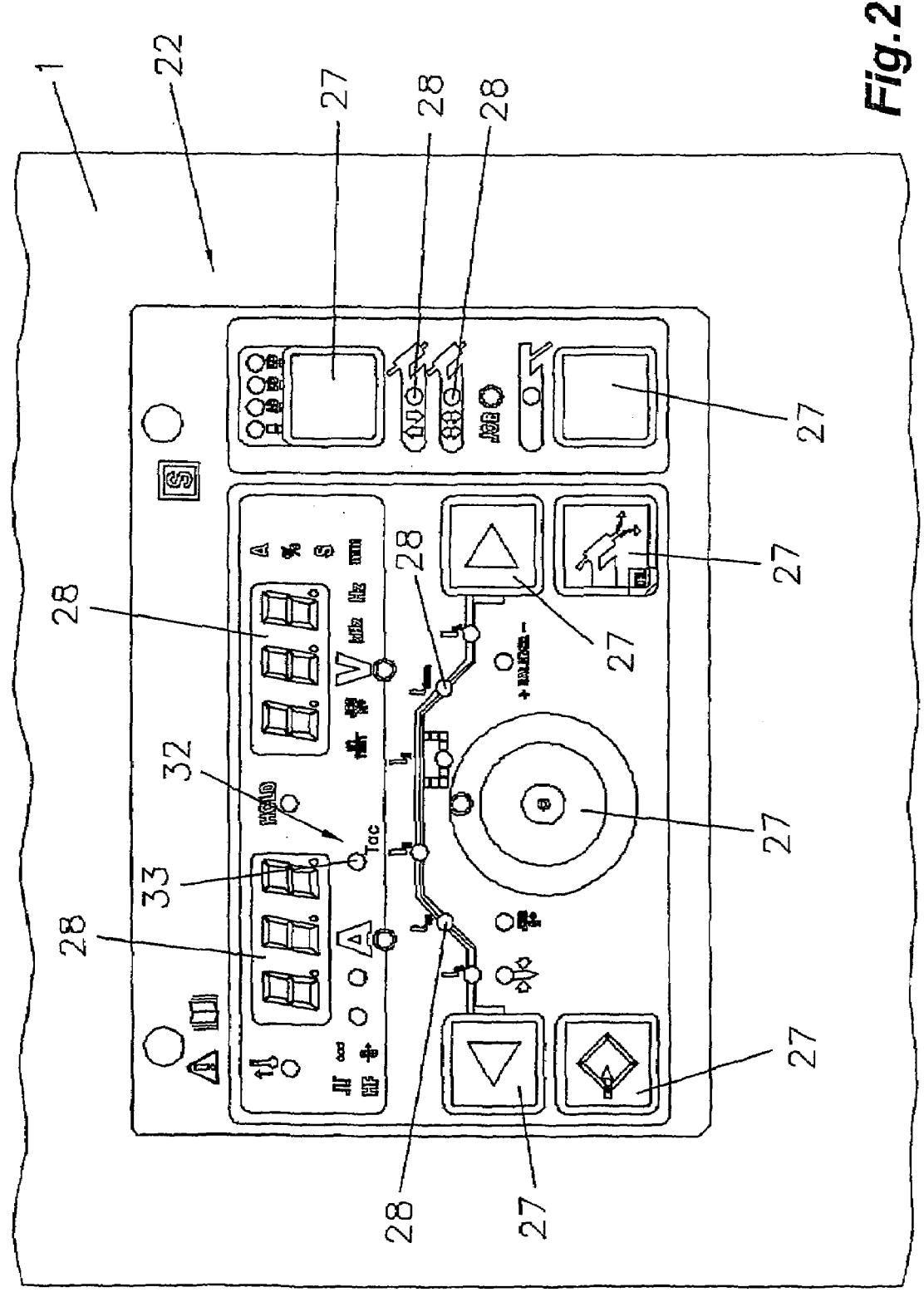
FIG. 2 is a schematic illustration of a input and/or output device of the welding apparatus.

The welding apparatus 1 further comprises an input and/or output device 22, as is schematically illustrated in FIG. 2, via which the most different welding parameters or modes of operation of the welding apparatus 1 can be set. In doing so, the welding parameters set via the input and/or output device 22 are transmitted to the control and/or evaluation device 4, which in turn will subsequently activate the individual components of the welding apparatus 1.

In the exemplary embodiment illustrated, the welding torch 10 is further connected with the welding apparatus 1, or welding plant, via a hose package 23. In the hose package 23, the individual lines leading from the welding apparatus 1 to the welding torch 10 are arranged. The hose package 23 is connected with the welding torch 10 via a prior-art connection device 24, whereas the individual lines contained in the hose package 23 are connected with the individual contacts of the welding apparatus 1 via connection sockets or plug-in connections. In order to ensure an appropriate tension relief of the hose package 23, the hose package 23 is connected with a housing 26 and, in particular, the basic housing of the welding apparatus 1 via a tension relief means 25.

In the known welding plants or welding apparatus 1, the setting of the parameters for a welding process is directly effected from the welding apparatus 1 via the input and/or output device 22. To this end, several operating elements 27 in the form of keys, rotary switches, potentiometers, integral emitters etc. are arranged on the input and/or output device 22, via which the user can select the individual parameters and vary the same. Furthermore, the input and/or output device 22 comprises display elements 28 where the values or set values or actual values of the just chosen parameter are displayed.

In addition, it is feasible in most cases to set or vary some of the welding parameters via external components 29 and, in particular, via the welding torch 10. To this end, at least an external operating unit 30 and display element 31 are, for instance, arranged on the welding torch in a manner that the user will be able to observe the respective value of a parameter via the display element 31 and change said parameter via the operating unit 30. Yet, in doing so, the user can only change a fixedly defined welding parameter, or several of the fixedly defined welding parameters, at the welding torch 10. If it is required to change other parameters, the user will have to set said further parameters directly on the welding apparatus 1. So far, it has been possible to allocate only specific, fixedly defined parameters to the external components.

With the solution according to the invention, it is now feasible, by invoking a control program 32 called parameter allocation program or "E-P program", to realize a flexible allocation of the parameters from the welding apparatus 1 to external components 29 and, in particular, the welding torch 10. The user is, thus, able to allocate at least one desired welding parameter to at least one external component 29 in order to enable said welding parameter to be subsequently adjusted from the external component 29. This constitutes a considerable enhancement of the welding process, because the user is now able to freely allocate, as a function of the respective application or welding process required, the welding parameters adjustable via the external components 29. Thus, the optimum adaptation of the external components 29 to the most different welding processes or applications is ensured. It is, of course, possible to allocate any desired number of parameters to one or several external components 29.

To this end, it is merely necessary for the user to start the control program 32 upon activation of the welding apparatus 1 and select the respective welding parameters on the welding apparatus 1 for one or several external components 29. The control program 32 is invoked by the activation of an operating element 27 provided on the welding apparatus 1 or on the power source 2 and, in particular, on the input and/or output device 22. After this, any desired welding parameter is set or selected and subsequently allocated to an external operating unit of an external component 29 such as, for instance, a welding torch 10, a remote controller, a control panel, a robot control, etc. by the renewed activation of an operating element 27 for the setting or alteration of a set value. This welding parameter can then be set and/or adjusted via the external operating unit of the external component 29. The user is, thus, able to set or change the welding parameter via the respective external component 29 upon execution of the control program 32 and the selected allocation.

In doing so, the call-in of the control program 32 may be realized in various known ways such as, for instance, by menu control, actuation of a respective operating element 27 or the like. In the input and/or output device 22 represented in FIG. 2, a display element 33 "Tac" is schematically illustrated, which indicates to the user the activation of the control program 32. Using the operating elements 27, the user may subsequently select the respective welding parameters on the welding apparatus 1 and allocate them to an external component 29. The indication of the activation of the control program 32 may, however, also be effected via the usual display elements 28.

Another option is to execute the control program 32 several times in a row, or select several parameters in one operating step, in order to allocate the same to one or several external components 29. The allocation of the welding parameters for the external components 29 is stored in the welding apparatus 1 by the control and/or evaluation device 4 so as to be permanently available to the user and enable a change of said allocation at any time.

Basically, it should be mentioned that the data exchange between the welding apparatus 1 and the external components 29 is effected via usual systems, for instance via control lines, optical fibers, bus systems or by radio. In order to be able to realize a flexible allocation, it is necessary that the control and/or evaluation device 4 carries out a suitable evaluation of the incoming signals from the external components 29 and these signals are allocated to the respective welding parameters such that the control and/or evaluation device 4 will subsequently be able to effect a change of the deposited value or set value so as to enable this change to be displayed on the external component 29 too.

It is, thus, feasible for the user to carry out a variable allocation of different welding parameters to external components without requiring an accordingly trained personnel.

The invention claimed is:

1. A method for setting a parameter of a welding apparatus, the method comprising the following steps:
   invoking a control program in the welding apparatus which occurs by renewed activation of at least one external operating unit on at least one external component comprising at least one of a welding torch or a robot control, wherein said at least one external operating unit is in communication with the welding apparatus;
   selectively allocating a selected welding parameter for setting or adjustment to said at least one external operating unit provided on said at least one external component, wherein allocating the selected welding parameter includes storing the welding parameter by using a control or evaluation device;
   setting or changing said selected welding parameter, based upon activation or adjustment of said at least one external operating unit provided on said at least one external component;
   evaluating any signals received from said at least one external operating unit of said at least one external component, by using said control or evaluation device of the welding apparatus;
   allocating said signals to at least one welding parameter and then adjusting said at least one welding parameter based upon said signals received from said at least one external operating unit of said at least one external component; and
   selectively allocating said at least one adjusted welding parameter to said at least one external operating unit provided on said at least one external component wherein a set of welding parameters are selectable and settable via said at least one operating element or via display elements provided on the welding apparatus.

2. The method as in claim 1, wherein said step of selectively allocating said selected welding parameter includes selectively allocating a plurality of welding parameters to several external operating units provided on said at least one external component.

3. The method as in claim 1, further comprising the step of transmitting any changes of said at least one external operating unit to the welding apparatus.

4. The method as in claim 2, wherein said step of allocating a plurality of welding parameters includes invoking said control program a plurality of times in a row to allocate a plurality of welding parameters to said several external operating units.

5. The process as in claim 1, further comprising the step of displaying at least one welding parameter on at least one of said at least one external operating unit.

6. The process as in claim 1, further comprising the step of adjusting additional welding parameters based upon said adjustment of welding parameters in response to said signals received by said at least one external operating unit.

7. The process as in claim 1, further comprising the step of providing said at least one external component in the form of a welding torch having at least one control for allowing a user to adjust a welding parameter.

8. A process for controlling a welding torch comprising:
   a) providing a welding apparatus having a central control having a memory with a plurality of welding parameters stored in said memory;
   b) providing an operating unit coupled to the welding torch, said operating unit being in communication with said central control, said operating unit for storing at least one of said welding parameters;
   c) providing at least one sensor in communication with said central control, said sensor for sending signals to said central control on said welding apparatus;
   d) selectively updating said welding parameters based upon said signals received from said sensor;
   e) providing at least one remote control coupled to the welding torch, said at least one remote control for manually updating at least one welding parameter; and
   f) displaying on a display disposed adjacent to the welding torch at least one of said plurality of welding parameters.

9. A method for setting a parameter of a welding apparatus, the method comprising the following steps:
   providing a control or evaluation device associated with the welding apparatus in a housing;
   selectively allocating at least one selected welding parameter to a first external operating unit provided on a first external component, which is external from said housing;
   evaluating signals received from said first external operating unit of said first external component, by using said control or evaluation device of the welding apparatus;
   allocating said signals to at least one welding parameter and then adjusting said at least one welding parameter based upon said signals received from said first external operating unit of said first external component; and
   selectively allocating said at least one adjusted welding parameter to said first external operating unit provided on said first external component, wherein said first external operating unit communicates information relating to welding parameters in at least a bi-directional manner with said control or evaluation device.

10. The process as in claim 9, further comprising the steps of:
   selectively allocating at least one selected welding parameter to a second external operating unit provided on a second external component;
   evaluating signals received from said second external operating unit of said second external component, by using said control or evaluation device of the welding apparatus;

allocating said signals to at least one welding parameter and then adjusting said at least one welding parameter based upon said signals received from said second external operating unit of said second external component; and selectively allocating said at least one adjusted welding parameter to said second external operating unit provided on said second external component, wherein said second external operating unit communicates information relating to welding parameters in at least a bi-directional manner with said control or evaluation device in the welding unit.

11. The process as in claim 9 wherein said first external component is in the form of a welding torch.

* * * * *